Dec. 20, 1932. O. L. HONNORS 1,891,539
DRAWING ROLL COUPLING
Filed March 16, 1931
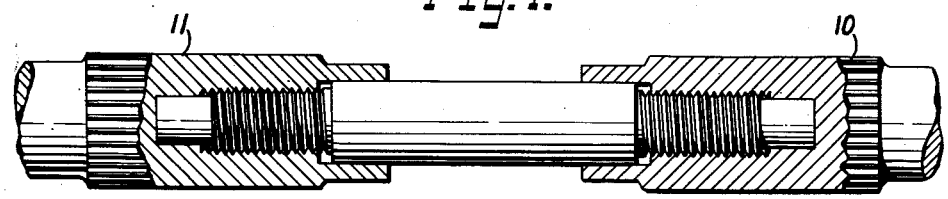
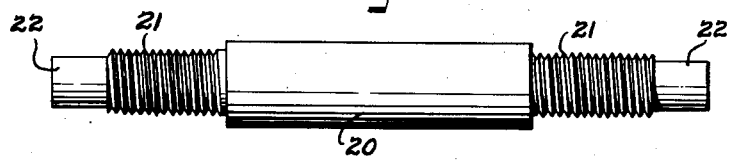
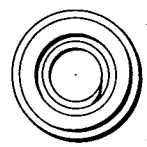 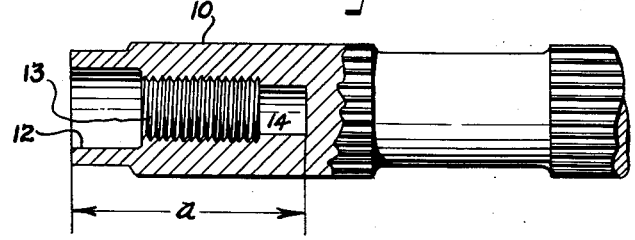
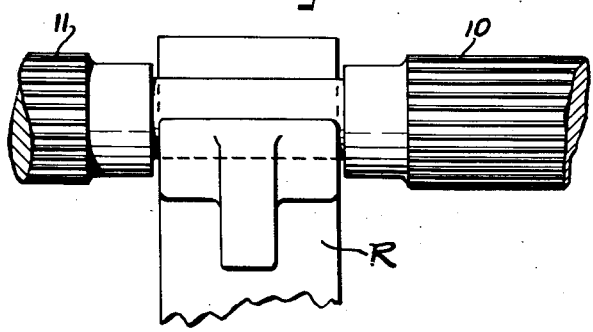
INVENTOR.
Oscar L. Honnors
BY
ATTORNEYS Patented Dec. 20, 1932

1,891,539

UNITED STATES PATENT OFFICE

OSCAR L. HONNORS, OF WHITINSVILLE, MASSACHUSETTS, ASSIGNOR TO WHITIN MACHINE WORKS, OF WHITINSVILLE, MASSACHUSETTS, A CORPORATION OF MASSACHUSETTS

DRAWING ROLL COUPLING

Application filed March 16, 1931. Serial No. 522,922.

This invention relates to a coupling for the sections of a drawing roll, such as is used in a spinning or twisting machine or in other dissimilar textile machines. Such rolls are built up to a desired length by joining successive sections together, and are commonly some twenty feet or more in total length. These long rolls are supported at spaced points in open bearings in roll stands mounted upon the machine frame.

It is found that the rolls wear out at the bearings much sooner than at any other point and the repair or replacement of a worn bearing is a laborious and troublesome job.

It is the object of my invention to provide a drawing roll in which the various sections of the roll are joined at the bearings by coupling members of an improved design and construction.

A particular advantage of my improved coupling lies in the accurate preservation of the original length of the assembled roll and the original spacing of the bearing portions.

Another advantage lies in the complete interchangeability of the parts.

My invention further relates to arrangements and combinations of parts which will be hereinafter described and more particularly pointed out in the appended claim.

A preferred form of the invention is shown in the drawing, in which

Fig. 1 is a side elevation of a portion of a drawing roll, partly in section and embodying my improvements;

Fig. 2 is a side elevation of my improved coupling member;

Fig. 3 is a side elevation, partly in section, of one end of a drawing roll;

Fig. 4 is an end view of the drawing roll, and

Fig. 5 is a detail side elevation showing a portion of a drawing roll assembled with a roll stand.

Referring to the drawing, I have shown end portions of a pair of drawing roll sections 10 and 11, adapted to be assembled to build up a drawing roll of any desired length.

In the preferred form, each drawing roll section, as 10, is provided with an axial opening in each end thereof and each axial opening comprises an outer cylindrical or unthreaded recess 12, an intermediate threaded portion 13, and an inner unthreaded portion 14. Preferably, the outer cylindrical recess 12 is of substantially the same diameter as the roll bearing to be described, the threaded portion 13 is of somewhat reduced diameter, and the unthreaded inner portion 14 is of still further reduced diameter.

The total length of the three parts of the axial opening, as indicated by the dimension $a$ in Fig. 3, is preferably exactly predetermined and is maintained substantially constant in all of the drawing roll sections, the total length of the drawing roll sections also being constant. But if the total length of the roll sections varies slightly, the distance between the inner end walls of the axial openings may be gauged and maintained constant.

My improved coupling member comprises a middle cylindrical or bearing portion 20, threaded portions 21, and unthreaded end portions 22. The total length of the coupling member between the end surfaces of the portions 22 is predetermined and maintained substantially constant. The bearing portion 20 is of such size as to fit accurately into the open-sided bearing in the usual roll stand R of the spinning frame.

The parts are assembled as shown in Fig. 1, with the ends of the bearing portion 20 received in the outer cylindrical recesses 12 of the drawing roll sections, and with the end portions 22 of the coupling received in the inner cylindrical openings 14. The parts are drawn together by relative rotation until each end of the coupling member is screwed into its adjacent drawing roll section as far as possible, firmly seating the end of the coupling portion 22 against the inner end wall of the associated cylindrical opening 14.

It will thus appear that the bearing portion 20 extends entirely across the space between the adjacent drawing roll sections and beyond the ends of the sections into the recesses 12.

It will also appear that each coupling member forms a spacing element or gauge for assembling the roll sections in acurate spaced relation, which is a very important advantage. As previously stated, the drawing roll sections are assembled to form rolls of very considerable length and a slight variation in spacing at each roll bearing would be multiplied throughout the length of the roll, producing a substantial and objectionable variation in the length of the total roll.

Attention is called to the fact that the ends of the coupling bearing portion 20 are spaced from the ends of the recesses or cylindrical openings 12 and furthermore the ends of the threaded portions 21 are spaced from the ends of the internally threaded openings 13.

The end spacing of the roll sections depends entirely on the over-all length of the coupling, which is a dimension which may be very easily maintained with great accuracy. When a roll bearing becomes worn, it may be very easily repaired by removing the worn coupling member and inserting a duplicate new coupling member in place thereof. This operation requires only a very short time and the original accurate alignment and spacing of the roll sections is effectively maintained.

Having thus described my invention and the advantages thereof, I do not wish to be limited to the details herein disclosed, otherwise than as set forth in the claim, but what I claim is:—

In a textile drawing roll, roll sections having axial openings at the opposite ends thereof, each comprising an outer cylindrical recess, a straight intermediate internally threaded portion and an inner cylindrical recess, the inner end walls of said inner recesses being spaced apart at a predetermined distance, and a coupling member having a middle cylindrical bearing portion, straight threaded portions adjacent said bearing portions and cylindrical end portions, the over-all length of said coupling member being accurately predetermined and the ends of said coupling member seating firmly against the inner end walls of said inner recesses, but the ends of said bearing portion being substantially spaced from the inner ends of said outer recesses.

In testimony whereof I have hereunto affixed my signature.

OSCAR L. HONNORS.